US007735312B2

(12) United States Patent
Votsmeier et al.

(10) Patent No.: US 7,735,312 B2
(45) Date of Patent: Jun. 15, 2010

(54) METHOD FOR DETERMINING THE INSTANT AT WHICH A NITROGEN OXIDE STORAGE CATALYST IS SWITCHED FROM THE STORAGE PHASE TO THE REGENERATION PHASE AND FOR DIAGNOSING THE STORAGE PROPERTIES OF THIS CATALYST

(75) Inventors: Martin Votsmeier, Maintal (DE); Juliane Kluge, München (DE); Ulrich Goebel, Hattersheim (DE); Jürgen Gieshoff, Gelnhausen (DE); Thomas Kreuzer, Karben (DE)

(73) Assignee: Umicor AG & Co. KG, Hanau-Wolfgang (DE)

( * ) Notice: Subject to any disclaimer, the term of this patent is extended or adjusted under 35 U.S.C. 154(b) by 708 days.

(21) Appl. No.: 10/589,424

(22) PCT Filed: Feb. 4, 2005

(86) PCT No.: PCT/EP2005/001128

§ 371 (c)(1),
(2), (4) Date: May 7, 2007

(87) PCT Pub. No.: WO2005/078254

PCT Pub. Date: Aug. 25, 2005

(65) Prior Publication Data

US 2007/0199303 A1    Aug. 30, 2007

(30) Foreign Application Priority Data

Feb. 17, 2004    (DE)    ........................ 10 2004 007 523

(51) Int. Cl.
*F01N 3/00*    (2006.01)
(52) U.S. Cl. ............................. 60/277; 60/274; 60/285; 60/295; 60/297

(58) Field of Classification Search .................... 60/274, 60/276, 277, 285, 286, 295, 297
See application file for complete search history.

(56) References Cited

U.S. PATENT DOCUMENTS 4,883,783 A    11/1989    Burk et al.

(Continued)

FOREIGN PATENT DOCUMENTS

DE    198 30 829 C1    4/1999

(Continued)

OTHER PUBLICATIONS

International Search Report.

(Continued)

*Primary Examiner*—Tu M Nguyen
(74) *Attorney, Agent, or Firm*—Kalow & Springut, LLP; William D. Schmidt

(57) ABSTRACT

When a nitrogen oxide storage catalyst is being regenerated, the regeneration may be terminated for example as a result of a premature load change in the engine, which can lead to incomplete emptying of the storage catalyst. The residual filling level which remains in the catalyst following an incomplete regeneration of this nature is used as the starting value for calculation of the filling level during the next storage phase. After incomplete regeneration, the nitrogen oxide conversion rate is initially greater than would be expected, on account of the residual filling level. By taking this increased conversion rate into account when calculating the filling level during the storage phase, it is possible to further improve the accuracy of the calculation.

5 Claims, 4 Drawing Sheets

U.S. PATENT DOCUMENTS

| | | | |
|---|---|---|---|
| 5,715,679 A * | 2/1998 | Asanuma et al. | 60/276 |
| 5,743,084 A * | 4/1998 | Hepburn | 60/274 |
| 6,338,831 B1 | 1/2002 | Strehlau et al. | |
| 6,341,487 B1 * | 1/2002 | Takahashi et al. | 60/286 |
| 6,385,966 B2 | 5/2002 | Zhang | |
| 6,460,328 B1 | 10/2002 | Hertzberg | |
| 6,460,329 B2 * | 10/2002 | Shimotani et al. | 60/285 |
| 6,637,197 B1 | 10/2003 | Stahl | |
| 6,684,628 B2 | 2/2004 | Gobel et al. | |
| 6,729,126 B2 * | 5/2004 | Ogiso et al. | 60/285 |
| 6,755,015 B1 * | 6/2004 | Manaka | 60/297 |
| 6,889,497 B2 | 5/2005 | Schnaibel et al. | |
| 2002/0026790 A1 | 3/2002 | Shimotani et al. | |

FOREIGN PATENT DOCUMENTS

| | | |
|---|---|---|
| DE | 198 23 921 A1 | 12/1999 |
| DE | 199 22 981 A1 | 11/2000 |
| DE | 199 51 544 C1 | 12/2000 |
| DE | 100 36 453 A1 | 2/2002 |
| DE | 100 17 940 C2 | 1/2003 |
| EP | 0 945 165 | 9/1999 |
| EP | 1 214 505 A | 6/2002 |
| EP | 1 273 337 A | 1/2003 |
| WO | WO 02/08548 A1 | 1/2002 |

OTHER PUBLICATIONS

Written Opinion.
International Preliminary Report on Patentability (PCT/EP2005/001128).

\* cited by examiner

METHOD FOR DETERMINING THE INSTANT AT WHICH A NITROGEN OXIDE STORAGE CATALYST IS SWITCHED FROM THE STORAGE PHASE TO THE REGENERATION PHASE AND FOR DIAGNOSING THE STORAGE PROPERTIES OF THIS CATALYST

FIELD OF THE INVENTION

The present invention relates to the exhaust-gas purification of internal combustion engines which are operated predominantly with a lean air/fuel ratio, known as lean-burn engines, including diesel engines and lean-burn gasoline engines. Lean-burn engines were developed to reduce fuel consumption. They should ideally save up to 25% of the fuel.

BACKGROUND OF THE INVENTION

One problem with these engines is the removal of the nitrogen oxides formed during combustion from the lean exhaust gas. Depending on the operating state of the engine, the nitrogen oxides emitted by these engines comprise from 60 to 95% by volume of nitrogen monoxide. On account of the high oxygen content of the lean exhaust gas, it is very difficult to reduce the nitrogen oxides to nitrogen and thereby to render them harmless. One possible way of removing the nitrogen oxides consists in purifying the exhaust gases with the aid of a nitrogen oxide storage catalyst.

Nitrogen oxide storage catalysts are well known to the person skilled in the art. They contain basic oxides, carbonates or hydroxides of the alkali metals, alkaline-earth metals and/or rare earths as well as a catalytic component, generally platinum, for oxidizing the nitrogen monoxide to nitrogen dioxide during normal operation, i.e. during lean-burn operation, of the engine with a lean air/fuel ratio. During lean-burn operation, the nitrogen dioxide which is generated is bound by the basic components of the storage catalyst in the form of nitrates. Since a nitrogen oxide storage catalyst of this type has only a limited storage capacity, it has to be regenerated from time to time, i.e. the stored nitrogen oxides have to be released again and reduced to form nitrogen. This is done by briefly operating the lean-burn engine with a rich air/fuel ratio. The required, regular regeneration of the storage catalyst limits the maximum saving on fuel consumption which can be achieved with a lean-burn engine.

The quantity of nitrogen oxides which has been taken up by a storage catalyst is described by what is referred to as the nitrogen oxide filling level, or just filling level for short. The filling level is the ratio of the quantity of nitrogen oxides actually stored to the maximum quantity of nitrogen oxides which can be stored in the catalyst under the prevailing exhaust-gas conditions.

For the reduction in nitrogen oxide emissions which can be achieved with a nitrogen oxide storage catalyst, it is important for the regeneration to be initiated in good time before the storage capacity of the storage catalyst is exceeded. For this purpose, it is customary to define a limit filling level, which is below the storage capacity of the catalyst. The prevailing, current filling level is determined while the storage catalyst is operating. If the current filling level exceeds the limit filling level, regeneration of the storage catalyst is initiated. If the limit filling level is selected to be a low one, the residual emissions of nitrogen oxides which still remain are low, but the fuel consumption is undesirably increased as a result of the frequent regeneration. If the limit filling level is close to the storage capacity, the proportion of nitrogen oxides which cannot be converted rises. Moreover, there is a risk of the defined limit filling level being exceeded more frequently on account of inaccurate determination of the current filling level, which further increases the remaining nitrogen oxide emissions.

The nitrogen oxide filling level which is present during the storage phase is generally determined continuously by integration of the nitrogen oxide mass stored per unit time at each instant. A mathematical model of the storage process is frequently used for this purpose. For example, DE 100 36 453 A1 describes a method for operating a nitrogen oxide storage catalyst of an internal combustion engine, in which, in a first operating phase (storage phase), the nitrogen oxides from the exhaust gas are stored in the storage catalyst and, in a second operating phase (regeneration phase), are released from the storage catalyst. The start of the second operating phase is determined on the basis of a nitrogen oxide filling level which is modeled on the basis of a nitrogen oxide storage model. To allow the start and end of the second operating phase to be determined as accurately and reliably as possible, the nitrogen oxide mass flow is recorded downstream of the storage catalyst and corrected as a function of the recorded value.

In addition to the problem of determining the optimum instant to switch from the storage phase to the regeneration phase, it is also necessary to monitor the increasing storage capacity with increasing operating time (aging) of the storage catalyst.

The aging of the storage catalyst is composed of a temporary component and a permanent component. The temporary component is related to poisoning by the sulfur compounds contained in the exhaust gas. These compounds, with the basic components of the storage catalyst, form sulfates which compete with the nitrates. The sulfates are significantly more stable than the nitrates and cannot be removed during normal regeneration of the storage catalyst. Therefore, they reduce the nitrate storage capacity to an increasing extent.

However, the sulfate loading of the storage catalyst can be reduced again. This process is known as desulfating. For this purpose, the catalyst has to be heated to approximately 650° C. and the fuel content of the exhaust gas has to be increased (enrichment). The normalized air/fuel ratio $\lambda$ during desulfating is typically in the range between 0.7 and 0.98.

The permanent aging of a storage catalyst is related to thermal damage to the component of the storage catalyst. Overheating causes the storage materials themselves and also the catalytically active precious metals to sinter together, so that they lose active surface area. This process cannot be reversed.

For use in a motor vehicle, it is necessary to monitor the aging of the storage catalyst in order to initiate desulfating on demand, to switch the vehicle to stoichiometric operation or if appropriate to trigger a signal that the catalyst needs to be replaced. This process is known as OBD (On Board Diagnosis). A suitable method for testing the efficiency of a nitrogen oxide storage catalyst which is arranged in the exhaust section of an internal combustion engine operated with a lean mix is described, for example, in DE 198 23 921 A1. For this purpose, the current storage capacity of the nitrogen oxide storage catalyst is determined, and a defective nitrogen oxide storage catalyst is diagnosed if the capacity drops below a predetermined minimum capacity.

SUMMARY OF THE INVENTION

It is an object of the present invention to improve the accuracy with which the instant at which a nitrogen oxide storage catalyst is switched from the storage phase to the regeneration phase is determined and thereby to open up the possibility of further optimizing the fuel consumption when operating a nitrogen oxide storage catalyst while, at the same time, maintaining low nitrogen oxide emissions. Moreover, the invention is also to provide a possibility for on board diagnosis of the performance of the nitrogen oxide storage catalyst.

This object is achieved by an improved method for determining the instant at which a nitrogen oxide storage catalyst is switched from the storage phase to the regeneration phase and for diagnosing the storage properties of the storage catalyst. The nitrogen oxide storage catalyst is in this case arranged in the exhaust section of an internal combustion engine operated predominantly with a lean air/fuel ratio and stores the nitrogen oxides contained in the exhaust gas during the storage phase but releases the nitrogen oxides again in the regeneration phase, during which the internal combustion engine is operated with a rich air/fuel ratio for a regeneration period, catalytically converting them as it does so. The filling level is determined continuously during the storage phase by integration of the nitrogen oxide mass stored per unit time at each instant, and the nitrogen oxide storage catalyst is switched over on the basis of the filling level which has been reached.

The method is characterized in that the filling level of the storage catalyst which remains after regeneration has been carried out is used as the starting value for determining the filling level during the next storage phase.

The present method can be employed both for lean-burn gasoline engines and for diesel engines.

DETAILED DESCRIPTION OF THE PREFERRED EMBODIMENTS

Figure 1:
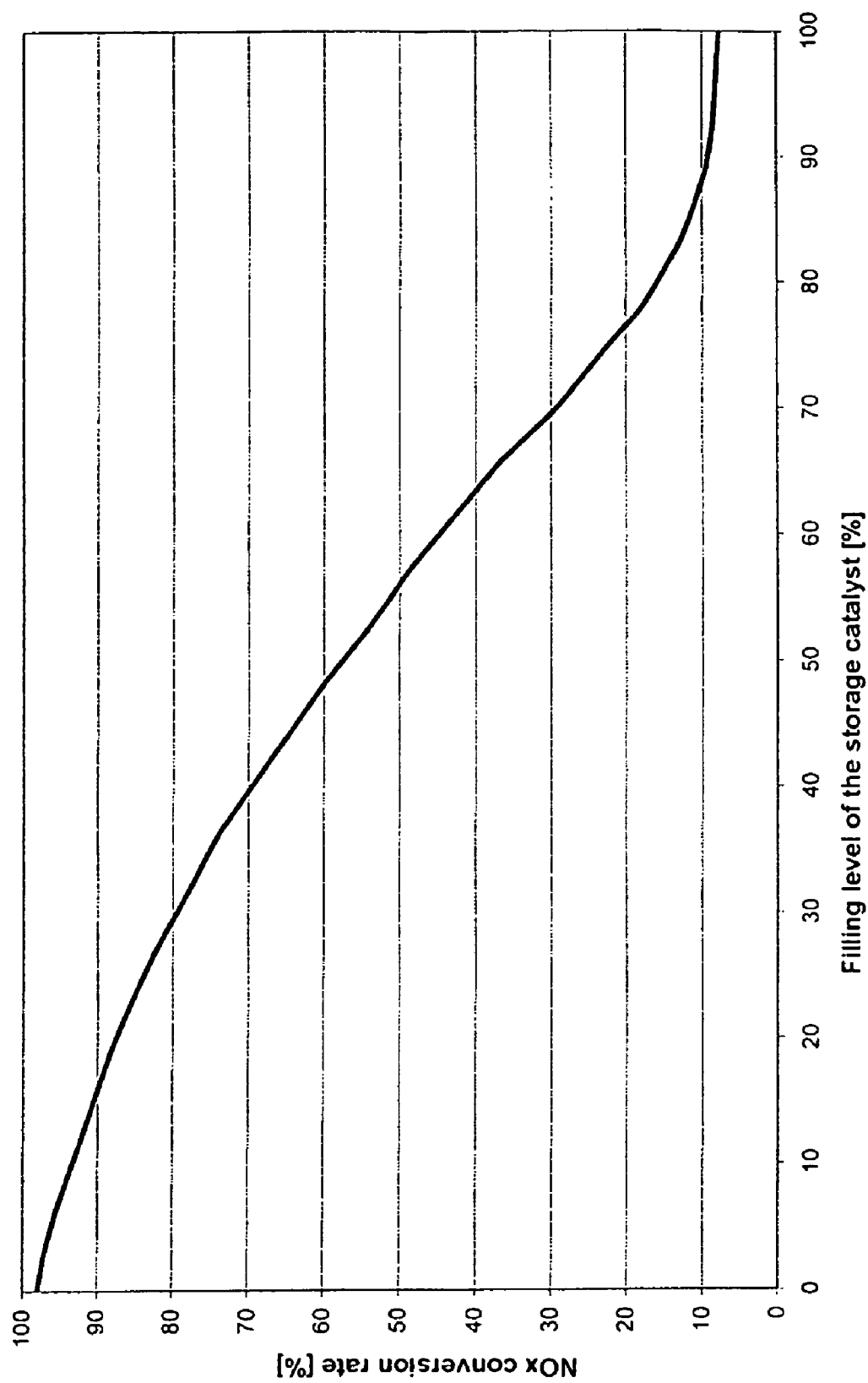
FIG. 1: shows the dependent relationship between the nitrogen oxide conversion rate and the filling level of the storage catalyst, calculated as $NO_2$ in grams per liter of catalyst volume [g/l] for a storage catalyst following complete regeneration.

To determine the nitrogen oxide filling level F of the storage catalyst during the storage phase (lean-burn operation of the engine), it is possible for the nitrogen oxide mass stored per unit time at each instant to be determined from the prevailing nitrogen oxide conversion rate U and the nitrogen oxide mass flow in the exhaust gas upstream of the catalyst, the corresponding conversion rate being dependent, inter alia, on the existing filling level, the exhaust-gas temperature, the normalized air/fuel ratio λ of the exhaust gas and on the nitrogen oxide mass flow.

The nitrogen oxide conversion rate U is defined in accordance with equation (1). $m_{NOx,up}$ denotes the nitrogen oxide mass flow upstream of the storage catalyst, and $m_{NOx,down}$ denotes the nitrogen oxide mass flow downstream of the storage catalyst:

$$U(F, T, \lambda) = \left(1 - \frac{m_{NOx,down}}{m_{NOx,up}}\right) \cdot 100\% \tag{1}$$

The nitrogen oxide conversion rate is at a maximum when the storage catalyst has been completely emptied. As the filling of the storage catalyst increases, the conversion rate decreases, down to zero when the filling level has reached the value F=1. The nitrogen oxides contained in the exhaust gas then pass through the storage catalyst freely. The change in the nitrogen oxide filling level ΔF during a period of time Δt results, according to equation (2) from the nitrogen oxide conversion rate U by multiplying it by the current nitrogen oxide mass flow upstream of the catalyst $m_{NOx,up}$, $$\Delta F = U(F,T,\lambda) \cdot m_{NOx,up}(t) \cdot \Delta t. \tag{2}$$

The filling level at the current instant can be obtained by integration over the operating states which have been passed through since the last regeneration. When a limit filling level is reached, the storage phase is terminated and the regeneration phase is initiated.

The limit filling level may be a fixed value which has been determined on a one-off basis for the particular storage catalyst. However, since the storage capacity of the storage catalyst is not only a materials property, but rather is also dependent on the prevailing operating conditions, it is preferable for the limit filling level to be defined as a function of these operating conditions.

In the case of lean-burn gasoline engines, the duration of the storage phase is approximately between 60 and 120 seconds, whereas the duration of the regeneration phase is approximately 1 to 5 seconds. During the storage phase, the engine is operated with a lean air/fuel ratio with a normalized air/fuel ratio λ of generally over 1.3. The normalized air/fuel ratio λ is in this case the air/fuel ratio standardized for stoichiometric conditions. To regenerate the catalyst, the engine is operated with a rich air/fuel ratio, i.e. the normalized air/fuel ratio of the exhaust gas leaving the engine is less than 1. A value of between 0.7 and 0.98 is customarily selected. The working temperature of typical storage catalysts is between 150 and 550° C.

The regeneration of the storage catalyst can be carried out without problems in lean-burn gasoline engines, since these type of engines can also be operated stably using a rich air/fuel ratio. The regeneration of the storage catalyst is in this case generally complete, i.e. the nitrogen oxides which have previously been stored are virtually completely released again during the regeneration.

The nitrogen oxide content of the exhaust gas from diesel engines is significantly lower than the nitrogen oxide content of the exhaust gas from lean-burn gasoline engines. Accordingly, the storage phase for the storage catalyst in the exhaust section of a diesel engine can be up to 300 seconds and more using the same storage capacity. Since a diesel engine does not run very stably when it is operated with a rich air/fuel ratio, it is difficult to regenerate the storage catalyst. The situation often arises whereby the regeneration has to be terminated prematurely, for example on account of changes to the operating state of the engine, and consequently at the start of the new storage phase the storage catalyst still has a residual filling level $F_{res}$ of nitrogen oxides, which according to the invention is used as the starting value for determining the nitrogen oxide filling level during the next storage phase.

Taking account of the residual filling level after a regeneration as the starting value for determining the nitrogen oxide filling level during the next storage phase leads to only minor changes in the case of lean-burn gasoline engines, since the storage catalyst of these engines can generally always be almost completely emptied during the regeneration. In the case of diesel engines, however, complete emptying of the storage catalyst during regeneration is not always guaranteed. In this case, taking account of the residual filling level in accordance with the invention when determining the instant at which the engine is switched from lean burn to rich operation leads to a significantly improved performance of the exhaust-gas purification system and generally also to a reduced fuel consumption.

The residual filling level after the storage catalyst has been regenerated can be determined using a previously determined relationship between the filling level and the filling level at the start of regeneration, the duration of regeneration, the normalized air/fuel ratio of the exhaust gas during the regeneration and the exhaust-gas temperature. For this purpose, the previously determined relationship can be stored in the form of empirically determined characteristic diagrams or as a mathematical model in the electronic control unit of the engine.

According to equation (2), to determine the filling level during the storage phase, the nitrogen oxide mass stored per unit time at each instant is determined from the prevailing nitrogen oxide conversion rate and the nitrogen oxide mass flow in the exhaust gas upstream of the catalyst. For this purpose, a nitrogen oxide sensor may be arranged in the exhaust section downstream of the storage catalyst, and this sensor records the nitrogen oxide mass flow downstream of the catalyst. The nitrogen oxide mass flow upstream of the catalyst, which is required to calculate the conversion, is generally stored in the electronic control unit of the engine for each operating point in the form of a mathematical model or empirically determined characteristic diagrams, and therefore does not necessarily have to be measured with the aid of a second nitrogen oxide sensor upstream of the catalyst. The operating parameters which are crucial to the mass flow of nitrogen oxides emitted by the engine include the engine speed, the torque (load), the air/fuel ratio fed to the engine, the temperature of the intake air, the ignition angle, the exhaust-gas recirculation, etc.

As an alternative to using measurement technology to record the nitrogen oxide mass flow downstream of the catalyst, and therefore also the nitrogen oxide conversion, it is also possible for these variables to be determined purely by calculation. For this purpose, it is necessary to determine in advance the dependency between the conversion rate and the filling level of the storage catalyst for various operating states of the engine. The storage catalyst is first of all conditioned, and then the conversion rate starting from a completely empty storage catalyst is determined experimentally as a function of the filling level which is established. This functional relationship is stored in the form of empirical data, e.g. as characteristic diagrams, or as a mathematical model in the electronic control unit of the engine.

In operation, the filling level of the storage catalyst is then calculated during a storage phase by integration of equation (2) over the operating states of the engine which have occurred since the last regeneration, with the residual filling level at the start of the storage phase being taken into account as a boundary condition in accordance with the invention. For this purpose, the nitrogen oxide mass flow $m_{NOx,up}$ associated with the instantaneous engine operating point and the conversion rate U for the filling level which has already been reached are taken from the characteristic diagrams or the mathematical model.

The determination of the filling level which has just been described can be achieved without having recourse to measured conversion values. However, in this case there is a risk of the calculations being increasingly at variance with the real conditions on account of aging of the storage catalyst. It is therefore recommended that the nitrogen oxide conversion rate additionally be determined by the above-described measurement of the nitrogen oxide mass flow downstream of the catalyst.

The additional measurement of the nitrogen oxide mass flow downstream of the storage catalyst, or the measurement of the nitrogen oxide conversion rate, makes it possible to diagnose the storage capacity of the catalyst by comparing this parameter with the nitrogen oxide conversion rates determined from the mathematical model or the empirical characteristic diagrams. The storage capacity of the catalyst has dropped if the measured nitrogen oxide mass flow exceeds the calculated nitrogen oxide mass flow over a defined period of time and by a predetermined amount. If this situation arises, it is first of all attempted to restore the storage capacity by means of sulfur regeneration (desulfating). After repeated sulfur regeneration without success, a signal can be emitted that the storage catalyst needs to be replaced. Until the catalyst is replaced, the engine can be reset to stoichiometric operation, since experience has shown that a damaged storage catalyst still has a sufficient catalytic activity for stoichiometric operation.

The method for determining the nitrogen oxide conversion rate by calculation from the characteristic diagrams or with the aid of a mathematical model which has been described so far assumes that the relationship between nitrogen oxide conversion rate and nitrogen oxide filling level is independent of the filling level which remains in the storage catalyst following a regeneration process. However, experimental tests carried out by the inventors have revealed that it is an oversimplification to assume such a relationship is independent of the recent history of the catalyst. It has been discovered that the nitrogen oxide conversion rate of the storage catalyst is higher immediately after partial or incomplete regeneration than would be expected according to the relationship between the nitrogen oxide conversion rate and the filling level after complete regeneration. Only after a certain period of time does the behavior of the storage catalyst shift back toward the behavior after complete regeneration. This fact leads to corresponding errors when integrating the filling level and therefore to incorrect determination of the instant at which the storage catalyst should be switched from the storage phase to the regeneration phase.

Therefore, a further improvement when determining the instant at which the storage catalyst is switched over can be achieved if the prevailing nitrogen oxide conversion rate during the storage phase is provided with a correction for the current operating state and instant following a previous, incomplete regeneration of the storage catalyst, in accordance with equation (3), the correction K being determined from a previously determined relationship between nitrogen oxide conversion rate and nitrogen oxide filling level after incomplete regeneration $$\Delta F = [U(F,T,\lambda) + K(F,F_{res},T,\lambda)] \cdot m_{NOx}(t) \cdot \Delta t, \quad (3)$$

where $F_{res}$ is the residual filling level after partial regeneration has taken place.

As has already been explained, it has been discovered that the correction K decreases with a rising filling level F, i.e. with an increasing distance between the instantaneous filling level and the residual filling level $F_{res}$ after the last regeneration (F–$F_{res}$), so that the performance of the catalyst approaches the performance of equation (1) again as the filling level increases. Therefore, the correction can approximately be assumed to be a function which decreases linearly or exponentially with (F–$F_{res}$).

Even when using equation (3) to integrate the filling level over the previous operating states of the engine, the method can once again be supplemented by measurement of the nitrogen oxide mass flow downstream of the catalyst in order to provide the option of diagnosing the storage capacity of the catalyst.

The following examples and the figures serve to improve understanding of the present invention.

Example

A conventional storage catalyst was produced by coating a honeycomb carrier of cordierite (62 cells/cm$^2$, corresponding to 400 cpsi) with a catalyst material based on barium oxide, which as catalytically active components contained platinum and rhodium on an active alumina.

A drilled core of this catalyst with a diameter of 2.54 cm and a length of 7.62 cm was used for the following tests in a model gas installation. In the model gas installation, the catalyst was subjected to various working cycles comprising storage and regeneration phases at a gas temperature of 250° C. and a space velocity of 77 000 h$^{-1}$. The gas compositions during these phases can be taken from the table below. Under these exhaust-gas conditions, the catalyst had a storage capacity of approximately 2.5 grams of $NO_2$ per liter of catalyst volume.

TABLE

Gas composition during storage and regeneration phase

| Gas component | Storage phase (lean) | Regeneration phase (rich) |
| --- | --- | --- |
| Carbon monoxide | 200 ppm by volume | 2% by volume |
| Hydrogen | 0 ppm by volume | 0.7% by volume |
| Propane | 34 ppm by volume | 1000 ppm by volume |
| Propene | 80 ppm by volume | 2060 ppm by volume |
| Nitrogen monoxide | 200 ppm by volume | 200 ppm by volume |
| Oxygen | 12% by volume | 1.4% by volume |
| Carbon dioxide | 6% by volume | 10.3% by volume |
| Water (steam) | 6.6% by volume | 12% by volume |
| Nitrogen | Remainder | Remainder |
| Air/fuel ratio | 2.27 | 0.93 |

Nitrogen Oxide Conversion Rate as a Function of the Filling Level After Complete Regeneration of the Storage Catalyst To determine the nitrogen oxide conversion rate as a function of the nitrogen oxide mass already stored on the catalyst in each case after complete regeneration, the catalyst was conditioned prior to each measurement at a gas temperature of 550° C. with 15 rich/lean cycles. Then, the nitrogen oxide conversion rate during a storage phase was determined from the nitrogen oxide concentration upstream and downstream of the catalyst, and the nitrogen oxide mass stored on the catalyst was calculated from this information by integration over the storage phase. Normalizing this nitrogen oxide mass to the storage capacity of approximately 2.5 g of NOx per liter of catalyst volume which is present under these exhaust-gas conditions results in the filling level of the storage catalyst.

FIG. 1 shows the corresponding performance of the catalyst. The nitrogen oxide conversion rate is virtually 1 (100%) for the fully regenerated catalyst. With increasing occupation by nitrogen oxides, the nitrogen oxide conversion rate decreases, dropping toward zero when the filling level approaches 100%.

This form of the functional relationship between nitrogen oxide conversion rate and filling level is virtually independent of the nitrogen oxide concentration contained in the exhaust gas and on its space velocity.

Figure 2:
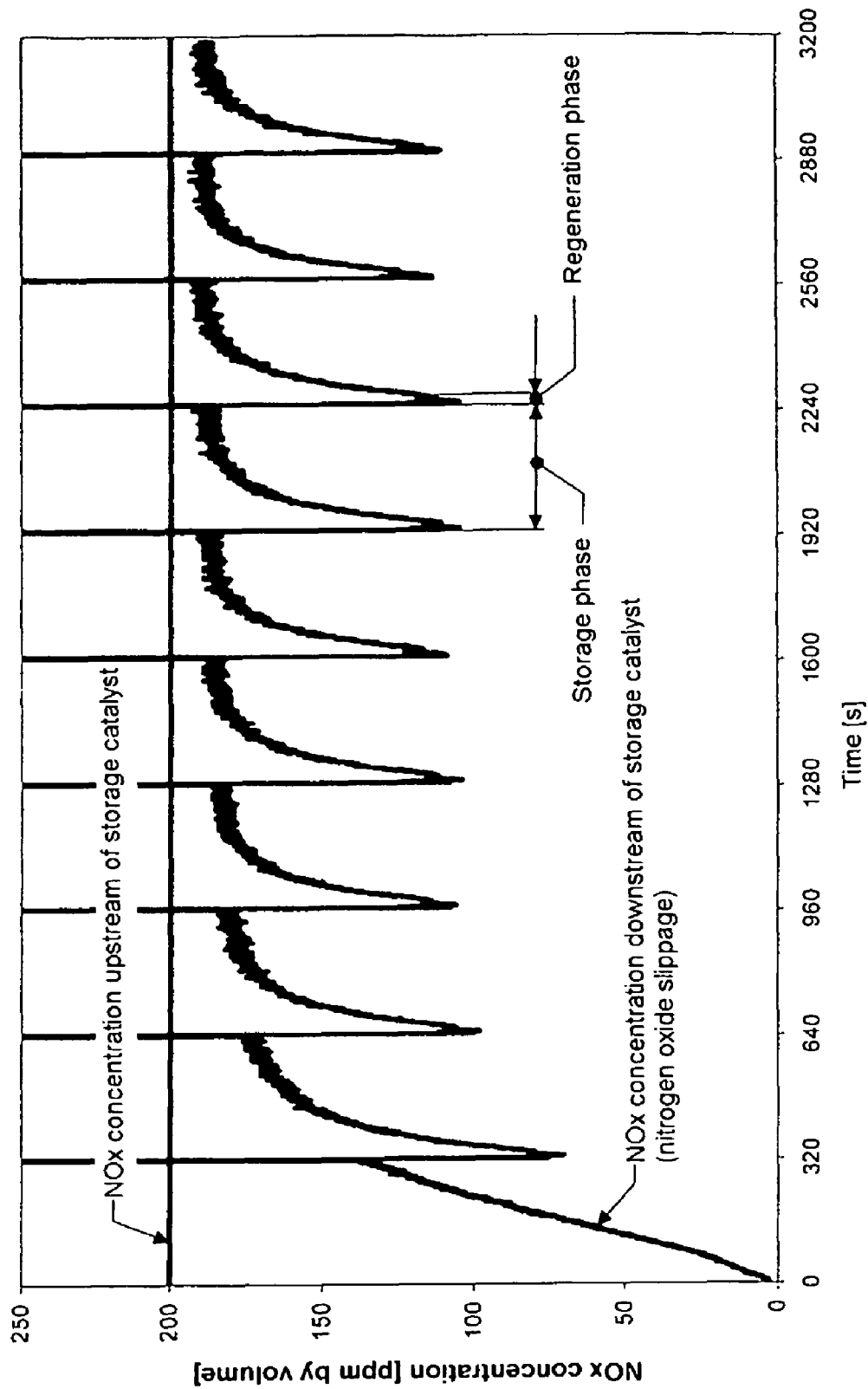
FIG. 2: shows nitrogen oxide slippage [ppm by volume] downstream of storage catalyst during repeated storage cycles with incomplete regeneration.

Nitrogen Oxide Slippage Downstream of Storage Catalyst During Repeated Storage Cycles with Incomplete Regeneration FIG. 2 shows the nitrogen oxide slippage downstream of the catalyst for successive working cycles comprising in each case one storage phase with a duration of 320 seconds and one regeneration phase of just 2 seconds.

It is clearly apparent that the nitrogen oxide slippage during a storage phase increases with increasing occupation of the storage catalyst. Without regeneration, the slippage would ultimately be equal to the nitrogen oxide concentration upstream of the catalyst. The storage capacity of the catalyst would be exhausted.

However, the regeneration carried out after in each case 320 seconds is insufficient to completely regenerate the catalyst, i.e. the slippage at the start of the next storage phase already amounts to a certain level, which increases with an increasing number of working cycles carried out but reaches a constant value after a certain number of storage cycles. In this steady state, exactly the same amount of nitrogen oxide is stored during a storage phase as can be released again during the regeneration phase.

The parameters used here (duration of storage and regeneration phase) are typical for use in a diesel vehicle if the regeneration phase cannot be completed on account of the need for a load change. In this case, a considerable proportion of the nitrogen oxides stored in the last storage phase remains on the storage catalyst. According to the invention, this fact is taken into account by virtue of the fact that when tracking the next storage phase the residual filling level which remains in the storage catalyst $F_{res}$ is taken into account as a starting value when calculating the subsequent nitrogen oxide storage.

Figure 3:
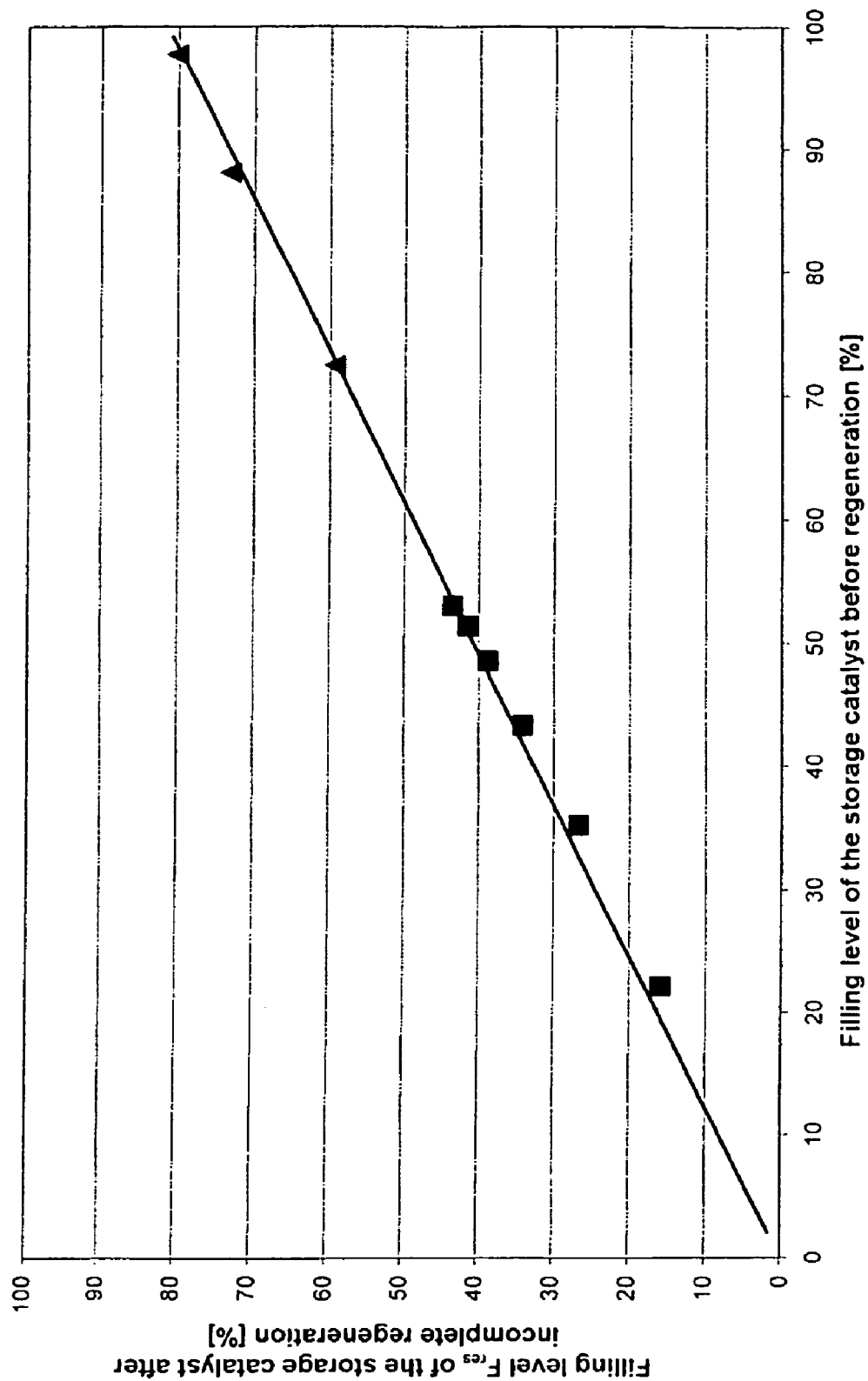
FIG. 3: shows the remaining filling level (residual filling level $F_{res}$) of a storage catalyst following incomplete regeneration (partial regeneration) as a function of the filling level at the start of the regeneration.

Residual Filling Level Remaining on the Storage Catalyst After Incomplete Regeneration FIG. 3 shows the relationship, obtained from such measurements, between the residual filling level remaining on the storage catalyst in the event of incomplete regeneration and the filling level present on the catalyst at the start of the regeneration. These two variables have an approximately linear relationship.

Two series of working cycles in accordance with FIG. 2 were recorded in order to determine the relationship shown in FIG. 3. In the first series, the storage phase had a duration of just 70 seconds, with a regeneration phase of 2 seconds. The measurement points obtained from this series are indicated by squares in FIG. 3. The storage phase of the second series lasted in each case 320 seconds, with the same regeneration period of just 2 seconds. The corresponding measurement points are indicated by triangles.

Relationship Between the Nitrogen Oxide Conversion Rate and the Filling Level of the Storage Catalyst After Incomplete Regeneration of the Storage Catalyst The relationship between the nitrogen oxide conversion rate and the filling level of the storage catalyst after in each case complete regeneration has already been shown in FIG. 1. This relationship is used to calculate the filling level during a storage phase by integration over the duration of the storage phase. If a defined limit value is reached or exceeded, the regeneration of the storage catalyst can be initiated.

According to the invention, the curve shown in FIG. 1 can be used as an approximation also for calculation of the filling level after incomplete regeneration. However, more detailed investigations carried out by the inventors have shown that immediately after a regeneration operation the nitrogen oxide conversion rate is greater than would be expected according to the residual filling level at the catalyst. Therefore, the curve shown in FIG. 1 was also determined for the case of incomplete regeneration. For this purpose, once again a series of working cycles with incomplete regeneration was recorded and the relationship between the nitrogen oxide conversion rate and the filling level was determined from the measured values.

Figure 4:
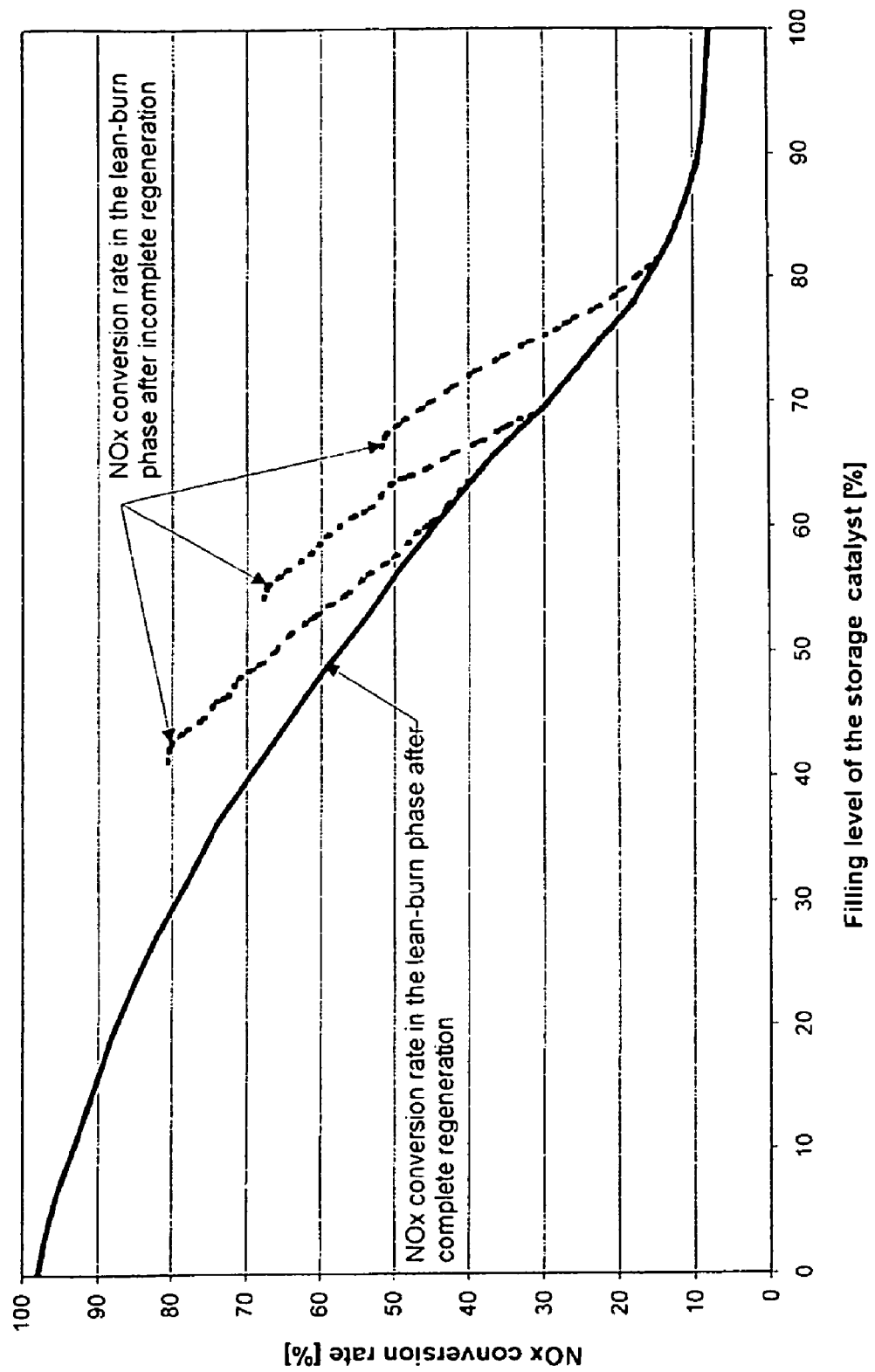
FIG. 4: shows the dependent relationship between the nitrogen oxide conversion rate and the existing filling level of a storage catalyst following incomplete regeneration of the latter.

FIG. 4 shows the curves determined in this way for the combination of a storage phase of 320 seconds with a regeneration phase of 2 seconds compared to the corresponding curve after complete regeneration in accordance with FIG. 1. As this relationship shows, the measured nitrogen oxide conversion rate immediately after incomplete regeneration is significantly greater than would be expected according to the filling level following complete regeneration (FIG. 1). However, the increase in the nitrogen oxide conversion rate drops rapidly as the filling level increases, with the result that after a short time the nitrogen oxide conversion rate is approximately equivalent to the value after complete regeneration.

According to the invention, therefore, after incomplete regeneration the storage loading to be calculated during the next storage phase can be significantly improved by taking account of the described increase in the nitrogen oxide conversion rate, for example by incorporating a correction element.

What is claimed is:

1. A method for determining the instant at which a nitrogen oxide storage catalyst is switched from the storage phase to the regeneration phase and for diagnosing the storage properties of this catalyst, the nitrogen oxide storage catalyst having a nitrogen oxide filling level and being arranged in the exhaust section of an internal combustion engine operated predominantly with a lean air/fuel ratio, and the filling level of the nitrogen oxide storage catalyst being determined continuously during the storage phase by integration of the nitrogen oxide mass stored per unit time at each instant and the catalyst is switched over on the basis of the filling level which has been reached, wherein the filling level of the storage catalyst which remains after regeneration has been carried out: (i) is used as the starting value for determining the filling level during the next storage phase and (ii) is determined using a previously determined dependent relationship between the filling level and the filling level at the start of regeneration, the duration of regeneration, the air/fuel ratio of the exhaust gas during the regeneration and the exhaust-gas temperature and wherein: (iii) the nitrogen oxide mass stored per unit time at each instant is determined from the prevailing nitrogen oxide conversion rate and the nitrogen oxide mass flow in the exhaust gas upstream of the catalyst, (iv) the nitrogen oxide conversion rate for the instantaneous operating point of the engine is determined with the aid of a mathematical model or empirical data for a fully regenerated storage catalyst, and the nitrogen oxide filling level of the storage catalyst is determined from this conversion rate by integration over the operating states of the engine which have occurred since the last regeneration, and (v) to determine the filling level, the prevailing nitrogen oxide conversion rate is provided with a correction, the correction being determined from a previously determined dependent relationship between nitrogen oxide conversion rate and filling level after incomplete regeneration.

2. The method as claimed in claim 1, wherein the nitrogen oxide mass flow downstream of the catalyst is additionally measured.

3. The method as claimed in claim 2, wherein to diagnose the storage capacity of the nitrogen oxide storage catalyst the measured nitrogen oxide mass flow downstream of the catalyst is compared with a calculated nitrogen oxide mass flow, the calculated nitrogen oxide mass flow being determined from the nitrogen oxide conversion rate, calculated as described in claim 1, and the nitrogen oxide mass flow upstream of the catalyst.

4. The method as claimed in claim 3, wherein, if the measured nitrogen oxide mass flow exceeds the calculated nitrogen oxide mass flow over a defined period of time and by a predetermined amount, it is concluded that the storage capacity of the catalyst has dropped and a sulfur regeneration of the catalyst is initiated.

5. The method as claimed in claim 4, wherein after repeated sulfur regeneration without success the storage catalyst is replaced.

* * * * *